United States Patent [19]
Asaoka et al.
[11] 3,768,081
[45] Oct. 23, 1973

[54] MINORITY CARRIER STORAGE DEVICE HAVING SINGLE TRANSISTOR PER CELL

[75] Inventors: Takashi Asaoka, Tokyo; Nobuaki Ieda, Tokorozawa, both of Japan

[73] Assignee: Nippon Telegraph and Telephone Public Corporation, Tokyo, Japan

[22] Filed: Feb. 22, 1971

[21] Appl. No.: 117,640

[30] Foreign Application Priority Data

Feb. 27, 1970 Japan ............................ 45/16458

[52] U.S. Cl. ............................ 340/173 R, 307/300
[51] Int. Cl. ............................ G11c 11/40
[58] Field of Search ................ 340/173 R; 307/238, 307/300, 215, 280

[56] References Cited

UNITED STATES PATENTS 3,070,779 12/1962 Logue ............................ 340/173 R
2,920,215 1/1960 Lo ............................ 307/215
3,510,850 5/1970 Glusick et al. ................ 340/173 R

*Primary Examiner*—Bernard Konick
*Assistant Examiner*—Jay P. Lucas
*Attorney*—Milton J. Wayne and Erwin Koppel

[57] ABSTRACT

Writing and read-out are accomplished by use of minority carrier storage effect in the PN junction between the base and collector of a transistor by suitably and selectively switching potentials applied to the base, emitter and collector of the transistor. In addition the potential application across the base-emitter junction is influenced by the stored minority carriers so that the current flowing between the collector and emitter may be controlled, and a longer retention of information is permitted. A single transistor element stores a single bit of information.

3 Claims, 7 Drawing Figures

MINORITY CARRIER STORAGE DEVICE HAVING SINGLE TRANSISTOR PER CELL

BACKGROUND OF THE INVENTION

The present invention relates to a memory device of the type requiring refresh or rewriting operations which uses the minority carrier storage effect in the PN junction between the base and collector of a transistor the current carried by the stored minority carriers and the transistor current controlled by the stored minority carriers.

A typical conventional semiconductor memory device employs flip-flops each of which consists of two transistors. The base of one transistor is connected to the collector of the other transistor and both of the emitters of the two transistors are grounded. The collectors of the two transistors are connected through respective load resistors to a voltage source. One of the two transistors is turned on to enable a current level to be present so that the flip-flop may be used as a memory device for storing information. In order that information may be written into and read out from such a memory cell, two more additional elements are required. In the conventional memory device, one memory cell comprises more than six elements so that the manufacture of integrated circuits with the memory cells incorporated at a greater density has been extremely difficult. In addition, the manufacture of integrated circuits at an economical cost has been also difficult.

In addition, the predetermined current lend must normally be maintained in order to hold stored information so that the power consumption becomes higher, thus resulting in a heating problem, which makes it very difficult to manufacture such memory devices in large scale integration.

There has been proposed a memory device in which the minority carrier storage effect in the PN junction be used for temporary storage of information and which employs the refresh or rewriting operation as for example disclosed in the U.S. Pat. No. 3070779. This memory device utilizes the minority carrier storage effect in the PN junction of a diode or transistor. Writing is accomplished depending upon whether the current flows across the PN junction or not, and read-out by utilizing the effect that the current flows if and only if the minority carriers are stored when the reverse current is applied across the PN junction. In the semiconductor memory device of the type described, the number of elements for storage of a single bit of information may be reduced greatly with the attendant decreased power consumption so that the problems encountered in the conventional flip-flop type semiconductor memory device may be overcome.

However, the memory cells in the memory device of the type described tend to lose the stored information as time elapse so that a refreshing or rewriting operation is required at a predetermined time interval after reading out the stored information. In order that the memory device of this type may be provided at a reasonably economical cost and the characteristics of the memory device be sufficiently utilized, it is required to increase the ratio of time required for writing or read-out to the time interval required for refreshing or rewriting. In the conventional memory device, however, only the current carried by the minority carriers stored in the PN junction has been utilized so that the current used for read-out exponentially decays as the time elapses. As a result the refresh or rewriting time interval can not be increased so that the above-described desired time ratio cannot be attained.

One of the objects of the present invention is therefore to provide an improved memory device.

Another object of the present invention is to provide an improved memory device in which one element may store a single bit of information by utilizing the minority carrier storage effect of a transistor.

Another object of the present invention is to provide an improved memory device which may be manufactured at less cost using minimal power consumption.

Another object of the present invention is to provide an improved memory device which enables the non-destructive read-out with a higher read-out current by utilizing the transistor action.

Another object of the present invention is to provide an improved memory device having a longer information holding time due to the amplification effect of a transistor.

The above and other objects of the present invention will become more apparent from the description of the preferred embodiments thereof taken in conjunction with the accompanying drawings.

SUMMARY OF THE INVENTION

The present invention may overcome the heating problem as well as the problem of reducing the number of elements required for storing information, which problems are encountered in the conventional memory device, by utilizing the minority carrier storage effect in the PN junction to store information. In addition not only the current carried by the minority carriers stored in the PN junction but also the transistor current which is controlled by the stored minority carriers is used so that the write time and a read-out time may be decreased and the refresh or rewriting interval may be increased. Thus the problems encountered in the conventional semiconductor memory device of the type requiring refreshing or rewriting may be overcome and the semiconductor memory device in accordance with the present invention may be fabricated at an economical cost.

Since the stored minority carriers are consumed in proportion to the quantity of current flowing, a time interval in which the current carried by only the stored minority carriers is considerably short and the quantity of the transistor current which is controlled by the stored minority carriers is about $h_{FE}$ times the stored minority carriers in the base ($h_{FE}$ is the current amplification factor of the transistor) so that the refresh or rewriting time interval may be increased. The present invention employs the current carried by the minority carriers in writing and the transistor curent which is controlled by the stored minority carriers in readout so that a shorter write and read-out time and a longer information holding time may be obtained. The two combined currents described may be separated from each other by selectively applying a potential to transistors from a power source without use of additional elements so that the memory device in accordance with the present invention may be fabricated as an integrated circuit by the conventional techniques.

BRIEF DESCRIPTION OF THE DRAWING

FIG. 5 shows an integrated circuit of the memory according to the present invention shown in FIG. 2. FIG. 6 shows a vertical sectional view taken along line A—A′ of FIG. 5.

DESCRIPTION OF THE PREFERRED EMBODIMENTS

Figure 1:
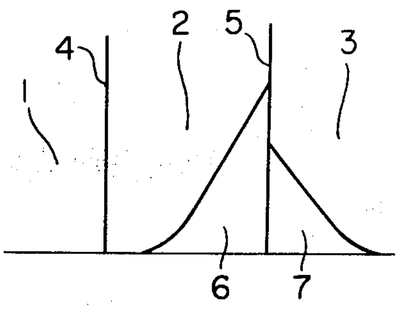
FIGS. 1A and 1B are schematic views illustrating the distribution of minority carriers injected into the base and collector regions of a transistor used in the present invention.
Figure 1:
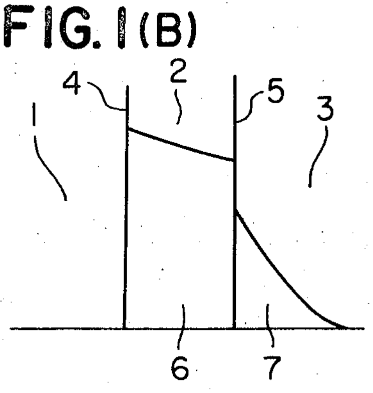

Referring to FIG. 1, there will be described the storage of the minority carriers in a PN junction of a transistor, the current carried by the stored minority carriers and the transistor current controlled by the stored minority carriers. As shown in FIG. 1, the transistor has an emitter region 1, a base region 2 and a collector region 3, and a base-emitter junction 4 is formed between the emitter and base regions 1 and 2 and a base-collector junction 5 between the base and collector regions 2 and 3. When a forward bias is applied so as to cause a forward current to flow across the base-collector junction 5, the minority carriers are injected into the base and collector regions 2 and 3. The distribution of minority carrier density is indicated by 6 and 7 (and the height indicates the density). When the forward bias across the base-collector junction 5 is removed after the injection of the minority carriers, the minority carriers are reduced in number as a function of time elapsed. The minority carrier density becomes almost zero after a time interval called "life time of minority carrier", and this phenomenon is called the storage effect of minority carriers. In case of a conventional epitaxial planar silicon transistor, the life time is of the order of 0.5 to 3 micro seconds.

When the reverse bias is applied across the base-collector junction 5 after the injection of the minority carriers, a reverse current flows temporarily and the stored minority carriers are consumed so that the density of minority carries may become zero within a time interval considerably shorter than the life time of minority carriers. This time interval is called the "reverse recovery time." After the reverse recovery time no reverse current flows. The reverse recovery time is of the order of tens of nano seconds in the case of the conventional epitaxial planar silicon transistor. A time interval from the time the forward bias is applied across the base-collector junction 5 to the time the forward current starts to flow is of the order of a few nano seconds in the transistor of the type described. Therefore, a time required for writing is of the order of tens of nano seconds.

When a voltage is applied between the emitter and collector after the injection of minority carries in the base-collector junction 5, the distribution of minority carrier density may be shown in FIG.1-B. Since the amount of current flowing from the collector to the emitter is supplied mainly from the emitter due to the carriers, the reduction of minority carriers in the base-collector junction 5 is insignificant (about $1/h_{FE}$ of the charge from the emitter). The time interval for which the current to the emitter continues to flow is of the order of 0.5 to 3 micro seconds when the base is at floating potential. It is this current to the emitter that is controlled by the stored minority carriers. By detecting the presence or absence of the current from the emitter, read-out of the stored information may be accomplished non-destructively, where the presence and absence of the stored minority carriers correspond to the information "1" and "0" respectively.

FIRST EMBODIMENT, FIG. 2

Figure 2:
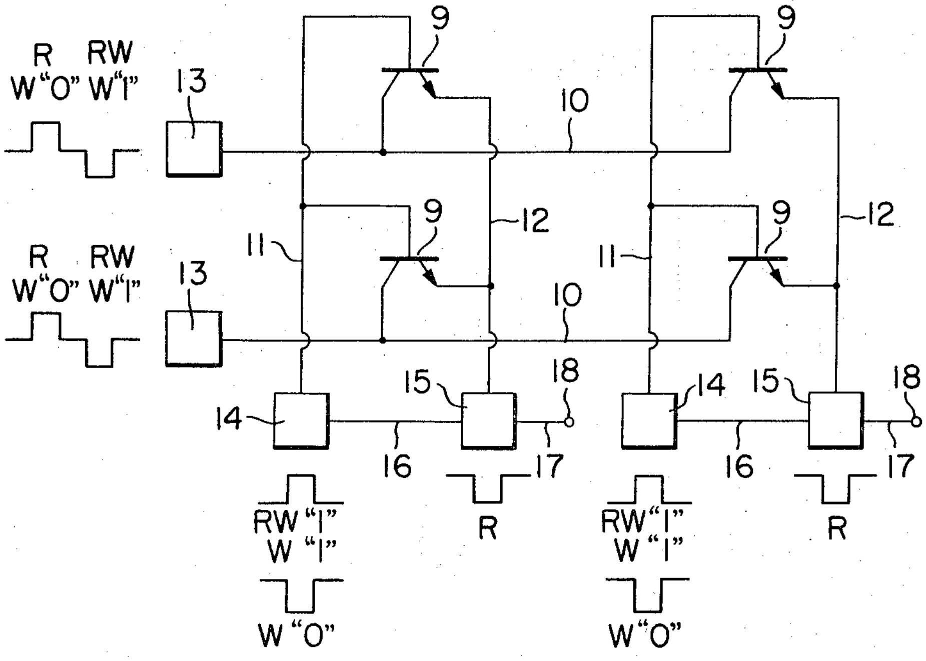
FIGS. 2, 3 and 4 are circuit diagrams of the preferred embodiments of the semiconductor memory device constructed in accordance with the present invention.

FIG. 2 shows a memory device of two words 9 two bits employing the transistors of the type explained with reference to FIG. 1. The transistors 9 each form a memory cell respectively and the collectors of the transistors 9 in each row are connected to a common line 10 which in turn is connected to a driver circuit block 13. The bases of the transistors o in each column are connected to a common line 11 while the emitters to a common line 12. The line 11 is connected to a write drive circuit block 14 while the line 12 to a read-out drive circuit block 15. The circuit blocks 14 and 15 are interconnected with each other through a signal line 16 which is used to transmit read-out information from the circuit block 15 to the circuit block 14 in case of refresh. The circuit block 15 is connected to an output terminal 18 through a signal line 17. Control signal lines for the circuit blocks 13, 14 and 15 are not shown for simplicity.

W "1" denotes the wave shape in writing "1"; W "0," the wave shape in writing "0"; R, the wave shape in read-out; RW, the wave shape in refresh; and RW "1," the wave shape in refreshing "1." Except in case of writing, the bases of memory cells must be kept at a floating potential.

OPERATION

WRITING "1"

A current path is formed by keeping at high voltage level the output line 11 of the circuit block 14 which belongs to the column of a selected transistor into which a bit of information is to be written and by keeping at low voltage level the output line 10 of the circuit block 13 in the selected row so that the current flows between the base and collector of the transistor 9 at the cross point of the selected output lines 10 and 11. The minority carriers are therefore stored in the base region of the selected transistor so that writing "1" is accomplished.

WRITING "0"

A current path is formed by keeping at low voltage level the output line 11 of the circuit block 14 which belongs to the column of a selected transistor into which a bit of information is to be written and by keeping at high voltage level the output line 10 of the circuit block 13 in the selected row. If the selected transistor 9 at the cross point of the selected column and row is turned on, the minority carriers in the base are forced to be pulled out so that the selected transistor 9 is turned off. On the other hand, when the selected transistor 9 is turned off, no current flows so that the selected transistor 9 remains in the off condition even when it is selected. Thus writing "0" is accomplished.

READ-OUT OPERATION

The output line 10 of the circuit block 13 of the row of a selected transistor from which a bit is to be read out is kept at high voltage level while the output line 12 of the circuit block 15 in the selected column at low voltage level. When the selected transistor 9 at the cross point of the selected row and column output line is on, the current flows from the collector to the emitter so that the current flows through the line 12. If the selected transistor 9 at the cross point is off, no current flows through the line 12. The read-out operation may be therefore accomplished by detecting whether the current flows through the line 12 or not. The read-out output appears at the output terminal 18 through the signal line 17.

REFRESH OPERATION

The minority carriers stored in the base of the transistor 9 drops in number as time elapses so that a refresh operation is required at a predetermined time interval which is dependent upon the characteristics of the transistor.

For this purpose, the read-out operation is first accomplished in the manner described above so that the information to be read out is temporarily stored in the circuit block 15. Only when the read out information is "1," the high voltage level output is derived from the circuit block 14 and in synchronism with this operation the output of the circuit block 13 of the address read out is kept at low voltage level. Thus refresh of "1" is accomplished.

SECOND EMBODIMENT, FIG. 3

Figures 3, 4:
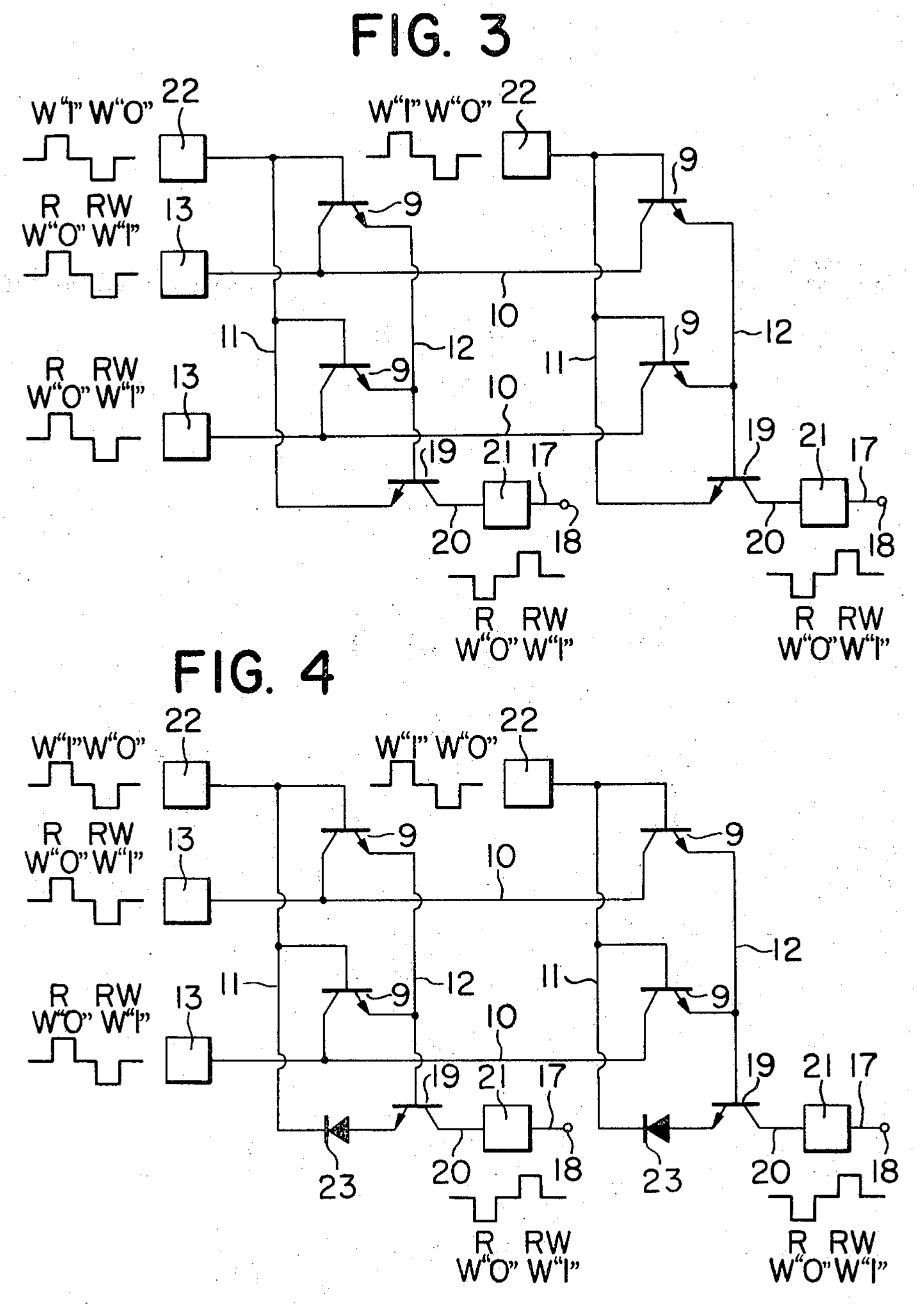

FIG. 3 illustrates a modification of the memory shown in FIG. 2, in which the information read out in refresh operation is temporarily stored as the minority carriers stored in the base of the transistor. The arrangements of the memory cells formed by the transistor 9, the circuit blocks 13, and the row and column lines 10, 11 and 12 are same as that shown in FIG. 2.

Assuming the transistor 9 as the first transistor, the base of the second transistor 19 is connected to the line 12; the emitter to the line 11; the collector to a circuit block 21; the line 11 to a circuit block 22; and the circuit block 21 to an output terminal 18 through the signal line 17. The control signal lines for the circuit blocks 13, 21 and 22 are not shown for simplicity.

In the Figure, R denotes the drive wave shape in read-out; W "0," the wave shape in writing "0"; W "1," the wave shape in writing "1"; and RW, the drive wave shape in refresh or rewrite operation. The base of each memory cell must be kept at a floating potential in case of holding memory.

OPERATION

WRITING

Writing is accomplished by AND operation of the circuit blocks 13 and 22. In case of writing "1," the output of the circuit block 22 connected to the base of a selected transistor into which a information "1" is written is kept at high voltage level while the output of the circuit block 13 connected to the collector of the said transistor is kept at low voltage level. In case of writing "0," the circuit blocks 13 and 22 produce pulses whose polarity is opposite to that of the pulses used in writing "1."

READ-OUT

Read-out is accomplished by AND operation of the circuit blocks 13 and 21. Read-out is accomplished when the output of the circuit block 13 connected to the collector of the transistor to be read out becomes high voltage level while the circuit block 21 connected to the collector of the transistor 19 which in turn is connected to the emitter of the transistor to be read out becomes low voltage level. When the selected transistor 9 at the cross point is on, the current flows from the collector to the emitter of the transistor. In addition the current flows into the circuit block 21 through the base and collector of the transistor 19. However, when the selected transistor 9 is off, no current flows. The read-out operation is accomplished by detecting whether the current flows into the circuit block 21 or not.

When the current flows from the base to the collector of the transistor 19, the charge in the base of the transistor 9 immediately flows out because of the inverse transistor effect of the transistor 19 so that rewrite operation is required. (The charge flows out within tens of nano seconds). The read out information is temporarily stored in the transistor 19 (which is on only when the selected transistor 9 is on) so that the content of the transistor 19 may be rewritten into the base-collector junction of the selected transistor 9, when the output of the circuit block 13 is kept at low voltage level while the circuit block 21 at high voltage level after read-out operation. In this case the transistor 19 may be immediately recovered within tens nano seconds because of the inverse transistor effect of the transistor 9.

REFRESH OPERATION

The information stored in each memory cell disappears within a time which is dependent upon the life time of minority carriers in the transistor so that refresh operation is required before the information stored is lost or erased. The refresh operation may be accomplished in the similar manner as the read-out and rewrite operations described above.

THE THIRD EMBODIMENT, FIG. 4

In order to prevent the rapid loss or extinction of information in the transistor 9 in the second embodiment shown in FIG. 3 in case of read-out operation, the anode of a diode 23 is connected to the emitter of the transistor 19 while the cathode to the column line 11. The diode 23 is for example a Schottky barrier diode whose recovery time is very fast. Because of the diodes 23, the read-out time of the transistor 9 may be increased and the recovery of the transistor 19 may be accomplished in the similar manner as the second embodiment shown in FIG. 3.

THE FOURTH EMBODIMENT, FIGS. 5 AND 6

Figure 5:
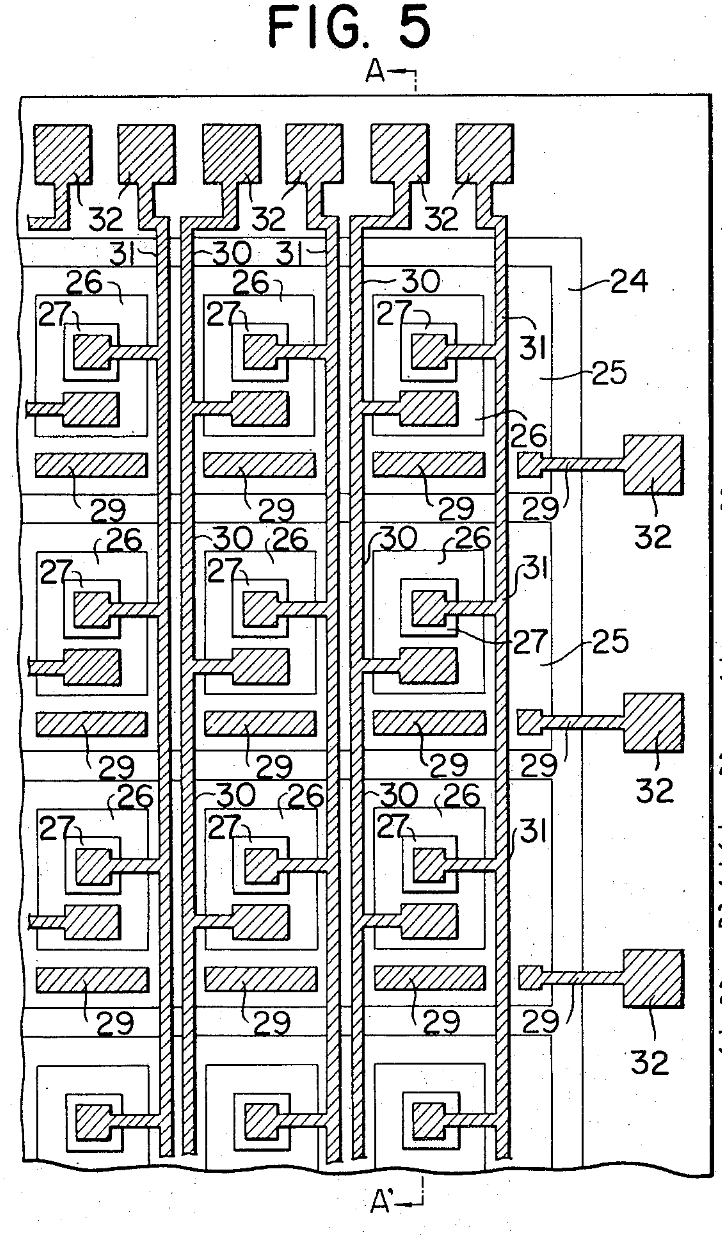
FIGS. 5 and 6 are top and sectional views of a fourth preferred embodiment of the present invention.

The fourth embodiment shown in FIG. 5 is an integrated circuit of the memory shown in FIG. 2. Numeral 24 denotes a p-type region electrically connected to a silicon substrate; 25, an n-type region forming a collector of a transistor; 26, a p-type region forming a base of the transistor; 27, an n-type region forming an emitter; 29, a collector electrode and its lead; 30, a base electrode and its lead; 31, an emitter electrode and its lead; and 32, connections for leading the leads 29, 30 and 31 out of the integrated circuit to an exterior circuit. The bases of the transistors in each column are connected to the common base lead 30 and the emitters of the transistors in each column are connected to the common emitter lead 31. The collector leads 29 are shown as being disconnected, but they are electrically connected with each other because the collector regions 25 are common in each row.

Figure 6:
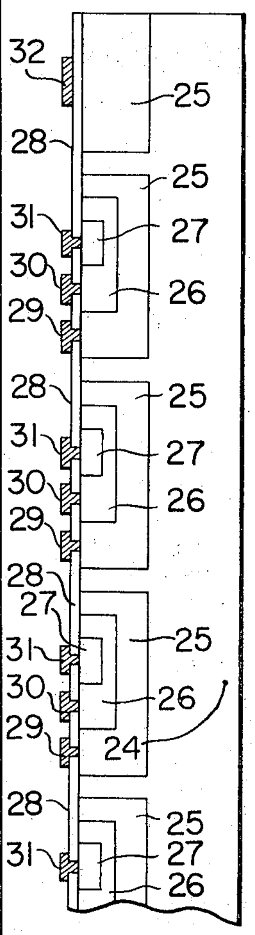

FIG. 6 shows a sectional view of the fourth embodiment shown in FIG. 5. Numeral 28 denotes an electrically insulating coating such as silicon dioxide.

The foregoing explanation is made as to the NPN transistor. However, it is apparent that the same holds true to the PNP transistor.

What is claimed is:

1. A semiconductor memory device capable of reading and writing operations characterized in that a plurality of transistors are arrayed into a matrix form, the collectors of the transistors in each row are connected to a common lead line, the bases and emitters of the transistors in each column are connected to common lead lines respectively, a plurality of bias supply devices are connectd to said common collector, base and emitter lead lines respectively, said bias supply devices selectively applying forward or reverse bias to selected common base and collector lead lines respectively to store or remove minority carriers from the base-collector junction of the selected transistor for the writing operation, said bias supply devices selectively applying bias to the selected common emitter and collector lead lines to forward bias the base-emitter junction of the selected transistor and applying a floating potential bias to the common base lead line connected to the said selected transistor so that the bias potential applied across said selected common emitter and collector lead lines may be applied across the base emitter junction of said selected transistor at a cross point of said matrix in the presence of the minority carriers stored in the base-collector junction of said selected transistor, said base-emitter junction being forward biased during the read-out operation for permitting transistor current to flow which is controlled by the presence or absence of said stored minority carriers as the current for read-out, whereby the memory holding time is increased and the number of rewriting operations required due to the disappearance of the information stored is reduced.

2. A semiconductor memory device set forth in claim 1 comprising an additional transistor per each column of said matrix, each of said additional transistors having its base connected to said common emitter lead line of respective columns of said first transistors, the collector of each of said additional transistors being connected to a respective circuit block, each of said circuit blocks including a read-out circuit, read-out drive circuit and a rewrite circuit, the emitter of each of said additional transistors being connectd to respective ones of the columns of said common base lead lines of said first transistors, whereby in case of reading the read-out information is stored in the PN junction between the base and collector of said additional transistor.

3. A semiconductor memory device set forth in claim 2 comprising a diode characterized by an extremely short recovery time which is interconnected between the emitter of each of said additional transistors and respective ones of the columns of said common base lead line of said first transistors to permit forward current to flow toward said additional transistors.

* * * * *

UNITED STATES PATENT OFFICE
CERTIFICATE OF CORRECTION

Patent No. 3,768,081 Dated October 23, 1973

Inventor(s) Takashi Asaoka and Nobuaki Ieda

It is certified that error appears in the above-identified patent and that said Letters Patent are hereby corrected as shown below:

Column 1, line 31: "lend" should be --level-- line 57: "elapse" should be --lapses--

Column 7, line 18: "connectd" should be --connected--.

Signed and sealed this 8th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,768,081 Dated October 23, 1973

Inventor(s) Takashi Asaoka and Nobuaki Ieda

It is certified that error appears in the above-identified patent and that said Letters Patent are hereby corrected as shown below:

Column 4, line 11, "9" should be -- X --.

This certificate supersedes Certificate of Correction issued October 8, 1974.

Signed and sealed this 21st day of January 1975.

(SEAL)

Attest:

McCOY M. GIBSON JR.
Attesting Officer

C. MARSHALL DANN
Commissioner of Patents